(12) United States Patent
Souche et al.

(10) Patent No.: US 11,589,125 B2
(45) Date of Patent: Feb. 21, 2023

(54) DYNAMIC CONTENT GENERATION

(71) Applicant: ACCENTURE GLOBAL SOLUTIONS LIMITED, Dublin (IE)

(72) Inventors: Christian Souche, Cannes (FR); Lucia Gattoni, Nice (FR); Edouard Mathon, Antibes (FR); Richard Vidal, Antibes (FR)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 0 days.

(21) Appl. No.: 16/259,681

(22) Filed: Jan. 28, 2019

(65) Prior Publication Data
US 2019/0261054 A1   Aug. 22, 2019

(30) Foreign Application Priority Data

Feb. 16, 2018  (EP) .................................. 18157254

(51) Int. Cl.
*H04N 7/025*       (2006.01)
*H04N 21/4725*    (2011.01)
(Continued)

(52) U.S. Cl.
CPC ..... *H04N 21/4725* (2013.01); *G06Q 30/0251* (2013.01); *H04N 21/4316* (2013.01); *H04N 21/4318* (2013.01); *H04N 21/812* (2013.01)

(58) Field of Classification Search
CPC .. H04N 21/812; H04N 21/235; H04N 21/435; H04N 21/4331; H04N 21/4532; H04N 21/44222; H04N 21/25891; H04N 21/4725; H04N 21/4316; H04N 21/4318; G06Q 30/0251
See application file for complete search history.

(56) References Cited

U.S. PATENT DOCUMENTS 5,808,695 A   9/1998  Rosser et al.
5,892,554 A   4/1999  DiCicco et al.
(Continued)

FOREIGN PATENT DOCUMENTS

CN   105872602      8/2016
WO   2015/047246    4/2015

OTHER PUBLICATIONS

Fanman et al., "From Logo to Object Segmentation", IEEE Transactions on Multimedia, vol. 15, No. 8, pp. 2186-2197.
(Continued)

*Primary Examiner* — Annan Q Shang
(74) *Attorney, Agent, or Firm* — Mannava & Kang, P.C.

(57) ABSTRACT

A system comprises a receiver to receive a main content. The system further comprises a detector to detect a placeholder in the main content for placement of a media object. Further, the system comprises an obtainer to obtain a plurality of media objects having placement attributes corresponding to the placeholder in the main content, where a placement attribute is indicative of characteristics of a media object compatible with the placeholder. The system further comprises a selector to select one of the plurality of media objects for being placed in the placeholder of the main content, based on a user profile. Further, the system comprises a generator to generate a final content indicative of the selected media object embedded in the main content.

14 Claims, 5 Drawing Sheets

(51) Int. Cl.
*H04N 21/431* (2011.01)
*H04N 21/81* (2011.01)
*G06Q 30/0251* (2023.01)

(56) References Cited

U.S. PATENT DOCUMENTS

| | | | |
|---|---|---|---|
| 6,100,925 A | 8/2000 | Rosser et al. | |
| 7,908,172 B2 | 3/2011 | Corts et al. | |
| 8,910,201 B1 | 12/2014 | Zamiska et al. | |
| 9,424,494 B1 | 8/2016 | Lineback et al. | |
| 9,602,884 B1* | 3/2017 | Eldering | H04N 21/4668 |
| 10,299,008 B1* | 5/2019 | Catalano | G06K 9/00288 |
| 10,623,789 B1* | 4/2020 | Spracklen | H04N 21/6156 |
| 2002/0078446 A1 | 6/2002 | Dakss et al. | |
| 2002/0144262 A1 | 10/2002 | Plotnick et al. | |
| 2005/0188012 A1* | 8/2005 | Dideriksen | H04S 3/00 |
| | | | 709/204 |
| 2007/0100698 A1 | 5/2007 | Neiman et al. | |
| 2007/0162952 A1* | 7/2007 | Steinborn | H04N 21/4363 |
| | | | 725/135 |
| 2007/0192782 A1* | 8/2007 | Ramaswamy | H04H 60/37 |
| | | | 725/9 |
| 2008/0046499 A1 | 2/2008 | Cabrera et al. | |
| 2008/0101456 A1 | 5/2008 | Ridge et al. | |
| 2008/0184288 A1 | 7/2008 | Lipscomb | |
| 2008/0195664 A1* | 8/2008 | Maharajh | H04L 67/306 |
| 2008/0249986 A1 | 10/2008 | Clarke-Martin | |
| 2009/0019487 A1 | 1/2009 | Kulas | |
| 2009/0092374 A1 | 4/2009 | Kulas | |
| 2009/0122748 A1* | 5/2009 | Gourhant | H04L 47/10 |
| | | | 370/328 |
| 2010/0064025 A1 | 3/2010 | Nelimarkka et al. | |
| 2010/0154007 A1 | 6/2010 | Touboul et al. | |
| 2010/0167809 A1* | 7/2010 | Perlman | A63F 13/358 |
| | | | 463/24 |
| 2011/0166925 A1* | 7/2011 | Khare | H04N 21/252 |
| | | | 705/14.43 |
| 2011/0177775 A1 | 7/2011 | Gupta et al. | |
| 2011/0214045 A1* | 9/2011 | Sumler | H04N 21/25891 |
| | | | 715/202 |
| 2011/0216167 A1 | 9/2011 | Katz et al. | |
| 2011/0314380 A1* | 12/2011 | Pritchett | H04N 21/23412 |
| | | | 715/723 |
| 2011/0316884 A1* | 12/2011 | Giambalvo | G06T 3/40 |
| | | | 345/660 |
| 2012/0139826 A1* | 6/2012 | Beals | G09G 5/14 |
| | | | 345/156 |
| 2012/0181329 A1* | 7/2012 | Gratton | G06F 16/00 |
| | | | 235/375 |
| 2012/0253937 A1 | 10/2012 | Wing et al. | |
| 2013/0083859 A1* | 4/2013 | Nemiroff | H04N 21/4305 |
| | | | 375/240.25 |
| 2013/0091519 A1 | 4/2013 | McLauchlan et al. | |
| 2013/0169801 A1* | 7/2013 | Martin | H04N 5/23219 |
| | | | 348/222.1 |
| 2013/0198745 A1* | 8/2013 | De | G06F 9/45533 |
| | | | 718/1 |
| 2013/0304604 A1 | 11/2013 | Hoffman et al. | |
| 2014/0013359 A1* | 1/2014 | Pan | H04N 21/4886 |
| | | | 725/60 |
| 2014/0043363 A1* | 2/2014 | Bala | G09G 5/00 |
| | | | 345/629 |
| 2014/0140680 A1 | 5/2014 | Jo | |
| 2014/0259056 A1 | 9/2014 | Grusd | |
| 2014/0282724 A1* | 9/2014 | Chalozin | H04N 21/235 |
| | | | 725/35 |
| 2014/0331334 A1* | 11/2014 | Kamai | G06F 3/14 |
| | | | 726/28 |
| 2014/0373057 A1* | 12/2014 | Hoffert | H04N 21/4312 |
| | | | 725/100 |
| 2015/0138238 A1 | 5/2015 | Wagg | |
| 2015/0222961 A1* | 8/2015 | Hardie | G06Q 30/02 |
| | | | 725/14 |
| 2015/0264416 A1 | 9/2015 | Heinz et al. | |
| 2015/0281746 A1* | 10/2015 | Lam | H04N 21/231 |
| | | | 725/116 |
| 2015/0339838 A1 | 11/2015 | Friedman et al. | |
| 2015/0341646 A1* | 11/2015 | Sze | H04N 19/89 |
| | | | 375/240.26 |
| 2015/0363635 A1 | 12/2015 | Suri et al. | |
| 2015/0382042 A1* | 12/2015 | Wagenaar | H04L 65/605 |
| | | | 725/34 |
| 2016/0034786 A1 | 2/2016 | Suri et al. | |
| 2016/0080830 A1* | 3/2016 | Kim | H04N 21/8193 |
| | | | 725/19 |
| 2016/0210512 A1 | 7/2016 | Madden et al. | |
| 2016/0212455 A1 | 7/2016 | Manna | |
| 2017/0062009 A1 | 3/2017 | Clifton et al. | |
| 2017/0270360 A1* | 9/2017 | High | G06F 16/5854 |
| 2017/0280181 A1* | 9/2017 | Ramaley | H04L 65/601 |
| 2018/0077511 A1* | 3/2018 | Mehta | H04S 7/30 |
| 2018/0211692 A1* | 7/2018 | Doherty | G06F 3/0488 |
| 2018/0218727 A1* | 8/2018 | Cutler | G10L 13/033 |
| 2019/0090035 A1* | 3/2019 | Eksten | H04N 21/26258 |
| 2019/0122698 A1* | 4/2019 | Iyer | G06F 16/686 |
| 2019/0158899 A1* | 5/2019 | Sakai | H04N 21/437 |
| 2019/0220652 A1* | 7/2019 | Li | G06N 3/0454 |

OTHER PUBLICATIONS

Kang Kai et al., "Object Detection from Video Tubelets with Convolutional Neural Networks", 2016 IEEE Conference on Computer Vision and Pattern Recognition (CVPR), IEEE, Jun. 27, 2016, pp. 817-825.

Wenguan Wang et al., "A Unified Spatiotemporal Prior based on Geodesic Distance for Video Object Segmentation", IEEE Transactions on Pattern Analysis and Machine Intelligence, Jan. 31, 2017, pp. 1-18.

Kruthiventi Srinivas SS et al., "Saliency Unified: A Deep Architecture for simultaneous Eye Fixation Prefiction and Salient Object Segmentation", 2016 IEEE Conference on Computer Vision and Pattern Recognition (CVPR), IEEE, Jun. 27, 2016, pp. 5781-5790.

Lipton AJ et al., "Moving target classification and tracking from real-time video", Applications of Computer Vision, 1998. WACV '98. Proceedings., Fourth IEEE Workshop on Princeton, NJ. USA. Oct. 19, 1998, pp. 8-14.

European Search Report dated Aug. 20, 2018 for EP application No. 18157254.6, 6 pages.

* cited by examiner

DYNAMIC CONTENT GENERATION

PRIORITY CLAIM

This application claims priority to European patent application number EP18157254.6 filed on Feb. 16, 2018, the disclosure of which is incorporated by reference in its entirety herein.

BACKGROUND

With the growing competition in the market place, it is getting difficult for organizations to establish and maintain their position in their sector. In order to stay ahead in the race, organizations are using various marketing strategies to reach out to customers. One such technique is depicting products and services by inserting media objects while streaming online content to viewers. Such content may include, but is not limited to, audio files, videos and images.

Such media objects to be inserted in a content may have to be selected based on various criteria, such as regulatory guidelines and historical data of a user. For example, in a video content showing an alcoholic beverage, the alcoholic beverage may be replaced with a non-alcoholic beverage in countries where displaying alcohol-based beverage is not allowed.

In recent times, targeted product display has gained widespread recognition. As is generally known, targeted product display refers to an approach where products and services are offered to an individual as the media objects in a content, based on preferences that can be determined from historical records of the user. Such a focused approach assists organizations to cater to consumers based on their specific preferences.

However, such an approach may require the generation of a number of versions of the same content with different media objects. For example, for each customer-specific variation, a new version of multi-media content having a user-specific display as a media object has to be generated. Owing to large consumer base, numerous versions of the same content with different media objects are generated and stored, which would need a large storage space. Resource consumption may also be excessive owing to continuous repetitive efforts required for generation of the versions. This may also lead to high costs and maintenance concerns considering handling for such a large amount of data. Moreover, handling of such a large amount of data may lead to slow content processing and inconvenience in viewing the content as well. Thus, modification of media objects in a product display may be expensive to implement and may require intensive CPU (Central Processing Unit) processing for implementation.

BRIEF DESCRIPTION OF DRAWINGS

Features of the present disclosure are illustrated by way of examples shown in the following figures. In the following figures, like numerals indicate like elements, in which.

SUMMARY

Figure 1:
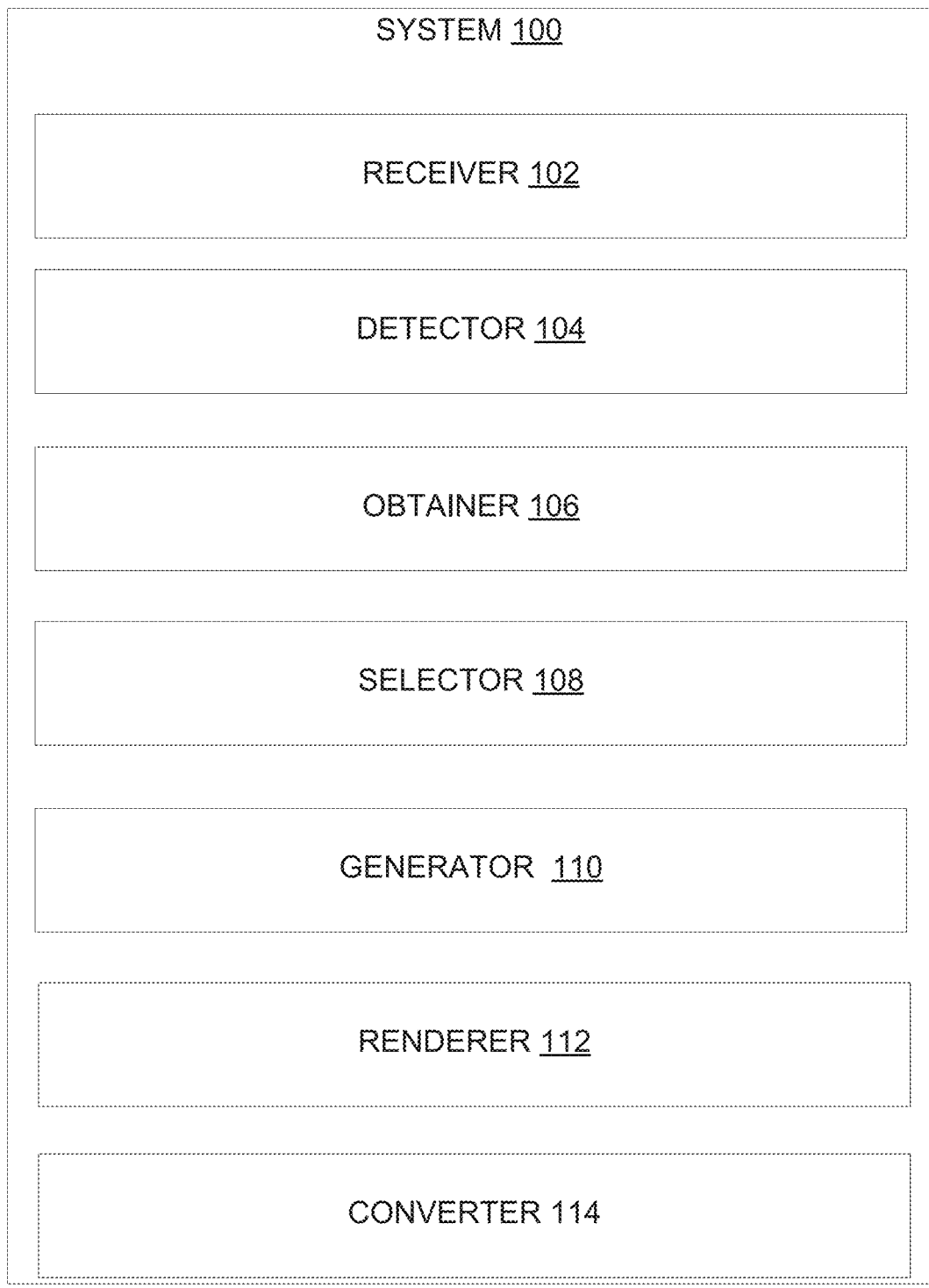
FIG. 1 illustrates a block diagram of a system, according to an example embodiment of the present disclosure.

This summary is provided to introduce concepts related to dynamic generation of content with media objects. These concepts are further described below in the detailed description. This summary is not intended to identify essential features of the claimed subject matter nor is it intended for use in determining or limiting the scope of the claimed subject matter.

According to an embodiment of the present disclosure, a system is disclosed. The system comprises a receiver to receive a main content. The main content includes at least one of a still image, an audio content or a video content. The system further comprises a detector in communication with the receiver to detect at least one potential placeholder, hereinafter placeholder, in the main content for placement of a media object. The media object includes at least one of an audio file, a video file, an image, or a text. The placeholder is defined based on at least one of a timestamp, a time range, a frame range, and a reference area in the main content. Further, the system comprises an obtainer in communication with the receiver and the detector. The obtainer is to obtain a plurality of media objects having placement attributes corresponding to the placeholder in the main content, where a placement attribute is indicative of characteristic(s) of a media object compatible with the placeholder, for instance to appropriately fit in the placeholder. The system further comprises a selector in communication with the receiver, the detector, and the obtainer. The selector is to select a media object from among the plurality of media objects for being placed in the placeholder of the main content, based on a user profile. Further, the system comprises a generator in communication with the receiver, the detector, the obtainer, and the selector. The generator is to generate a final content indicative of the selected media object embedded in the main content.

According to another embodiment of the present disclosure, a system is disclosed. The system comprises a receiver to receive a main content. The main content includes at least one of a still image, an audio content or a video content. The system further comprises a detector in communication with the receiver to detect a placeholder in the main content for placement of a media object. The media object includes at least one of an audio file, a video file, an image, or a text. A placeholder is defined based on at least one of a timestamp, a time range, a frame range, and a reference area in the main content. Further, the system comprises an obtainer in communication with the receiver and the detector to obtain a plurality of media objects having placement attributes corresponding to the placeholder in the main content, wherein a placement attribute is indicative of characteristics of a media object to fit in the placeholder. The system further comprises a selector in communication with the receiver, the detector, and the obtainer. The selector is to provide the plurality of media objects to a user. The selector further is to receive an instruction from the user, the instruction being indicative of selection of a media object, from among the plurality of media objects, for being placed in the placeholder of the main content. Further, the system comprises a generator in communication with the receiver, the detector, the obtainer, and the selector. The generator is to generate a final content indicative of the selected media object embedded in the main content.

According to another embodiment of the present disclosure, a computer-implemented method executed by at least one processor is disclosed. The method comprises receiving a main content, where the main content includes at least one of a still image, an audio content or a video content. The method further comprises detecting a placeholder in the main content for placement of a media object. The media object includes at least one of an audio file, a video file, an image, or a text. A placeholder is defined based on at least one of a timestamp, a time range, a frame range, and a reference area in the main content. Further, the method comprises obtaining a plurality of media objects having placement attributes corresponding to the placeholder in the main content, where a placement attribute is indicative of characteristics of a media object to fit in the placeholder. Further, the method comprises selecting one of the plurality of media objects for being placed in the placeholder of the main content, based on a user profile. The method further comprises generating a final content indicative of the selected media object embedded in the main content.

Other and further aspects and features of the disclosure will be evident from reading the following detailed description of the embodiments, which are intended to illustrate, not limit, the present disclosure.

DETAILED DESCRIPTION

For simplicity and illustrative purposes, the present disclosure is described by referring mainly to examples thereof. The examples of the present disclosure described herein may be used together in different combinations. In the following description, details are set forth in order to provide an understanding of the present disclosure. It will be readily apparent however, that the present disclosure may be practiced without limitation to all these details. Also, throughout the present disclosure, the terms "a" and "an" are intended to denote at least one of a particular element. As used herein, the term "includes" means includes but not limited to, the term "including" means including but not limited to. The term "based on" means based at least in part on.

In the realm of Internet marketing, advertisements for products and/or services may be rendered to users when they are streaming multimedia content such as, for example, a video file, an audio file, a still image, or any combination thereof, over the Internet. Different advertisements for different products and/or services may be rendered to different users based on a variety of factors, at various times. In one example technique, media objects associated with products and/or services may be added and/or replaced within the multimedia content before/during presentation of the multimedia content to the user, in order to render advertisements to a user.

When determining which advertisements to render, it may be appropriate to consider factors such as user preferences and/or government regulations, which may dictate what products and/or services may be advertised in multimedia content in a geographical area. Based on user preferences and/or government regulations, a system may determine to insert different media objects in the multimedia content. Therefore, the multimedia content may be rendered to users with different media objects added and/or replaced therein in different geographical areas.

The abovementioned technique of adding and/or replacing media objects in multimedia content based on different factors may be used in targeted advertisements. Advertisements using targeted advertising techniques are generally rendered to users when they are streaming content such as, for example, movies and images, over the Internet. Target advertising involves identifying potential customers based on user data associated therewith. The user data associated with a user is indicative of preferences of the user. Based on the user data, the preferences of the user may be determined and, accordingly, selected advertisements can be rendered to the user. The goal is to increase the probability of the customer buying the advertised product or service because the product or service is related to the customer's preference. One or ordinary skill in the art will appreciate that while the present disclosure discusses the features associated with adding and/or replacing media objects in multimedia content to create targeted advertisements, the disclosed techniques may be used in other domains as well. For example, the disclosed techniques may be used to distribute multimedia content that raises social awareness about one or more issues, where the content is modified based on factors such as geographical region, cultural norms, regulatory guidelines, and the like.

In example targeted multimedia techniques, multiple versions of a single content may be generated and stored. Each of the multiple versions includes one or more media objects related to a specific user preference. On learning about a preference of the user, a version of the content most specific to the preference of the user can be delivered to that user.

As an example, a first version of a video A may include media objects related to a user preference, say cars. For instance, the first version may include a media object related to a car and another media object related to a car cleaning service. In another example, a second version of the video A may include media objects related to a user preference, say, apparel shopping. In this example, the second version of the video A may include a media object related to an online shopping portal and another advertisement to a clothing brand. As can be observed, different versions of the same video A include media objects related to different user preferences. Now, when a user who has an interest in cars, seeks to watch the video A, the version of the video A that includes the media objects related to cars is rendered to the user.

As may be gathered, generation and storage of the multiple versions for the same content is a resource intensive task. For instance, repeated processing operations are to be performed for generating the multiple versions. Furthermore, given the considerable extent and variety of possible user preferences, a substantial number of versions may need to be created for the content thereby consuming significant amounts of storage space.

According to aspects of the present disclosure, a system for dynamic generation of content with media objects is described. In an embodiment, the system receives a main content such as, for example, a still image, an audio content, and a video content. On receiving the main content, the system is to detect a placeholder in the main content for placement of a media object. In an example, the placeholder is defined based on at least one of a timestamp, a time range, a frame range, and a reference area in the main content. The media object may include an audio file, a video file, an image, and/or text. Further, the media object may be rendered as an advertisement to a user.

In an example, the system further obtains a plurality of media objects having placement attributes corresponding to the placeholder in the main content. As used herein, a placement attribute is indicative of characteristics of a media object compatible with the placeholder such as, for example, to fit in the placeholder.

Upon obtaining the plurality of media objects, the system is to select one of the plurality of media objects for being placed in the placeholder of the main content. In an example embodiment, the media object to be placed in the placeholder is selected based on a user profile. In an alternate example embodiment, the system is to provide the plurality of media objects to the user. Subsequently, the system is to receive an instruction indicative of selection of a media object for being placed in the placeholder of the main content from the user. Based on the selected media object, the system generates a final content indicative of the selected media object embedded in the main content.

The system of the present disclosure offers a comprehensive and time-effective approach for dynamic generation of content with media objects. The proposed approach averts a need to generate and store of multiple versions of the content. As a result, processing load and usage of storage space is reduced. Furthermore, placement of suitable media objects in the placeholder produces more effective advertisements. Further, the system offers multiple techniques for selection of the media object to be embedded in the main content. Therefore, the system and the method of the present disclosure offer a comprehensive, efficient, and time-effective dynamic generation of the content with the media objects.

FIG. 1 illustrates a schematic view of a system 100 for dynamic generation of content with media objects, according to an example of the present disclosure. In one example embodiment, the content may include at least one of a still image, an audio content or a video content. The system 100 may include a receiver 102, a detector 104, an obtainer 106, a selector 108, a generator 110, a renderer 112, and a converter 114.

In an example embodiment, the detector 104 may be in communication with the receiver 102. The obtainer 106 may be in communication with the receiver 102 and the detector 104. The selector 108 may be in communication with the receiver 102, the detector 104, and the obtainer 106. The generator 110 may be in communication with the receiver 102, the detector 104, the obtainer 106, and the selector 108. The renderer 112 and the converter 114 may be in communication with generator 110.

In an example embodiment, the receiver 102 may receive the content also referred to as main content. The main content may include, but is not limited to, the still image, the audio content, and the video content. In an example embodiment, the audio content may be encoded in an Advanced Audio Coding (AAC) format, an MP3 format, or an OGG format. Similarly, the video content may be encoded in an MPEG2 format or an X264 format. Furthermore, the still image may be encoded in a PNG format or a JPEG format. One of ordinary skill in the art will appreciate that the main content may be encoded in other formats not disclosed above without departing from the scope of the disclosure.

In an example embodiment, the receiver 102 may receive metadata associated with the main content as well. Such metadata may include, but is not limited to, menus, chapter, and subtitles of the main content. The content may be received from a data repository (not shown), which may be an internal data repository or an external data repository.

Once the main content is received, the detector 104 may detect one or more placeholders in the main content for placement of media objects. A placeholder is indicative of a position in the main content for placing a media object. The placeholder in the main content may be defined based on at least one of a timestamp, a time range, a frame range, and a reference area in the main content. Furthermore, the media object may include, but is not limited to, an audio file, a video file, an image, or a text file.

In an example embodiment, when the main content is the audio content, the placeholder for the placement of the media object is defined based on the time stamp. For example, the placeholder may be defined as a spot in the audio between a time stamp 4:30:00 minutes to a time stamp 4:30:08 minutes. Therefore, the main content, i.e., the audio content, has a placeholder of 8 seconds between the mentioned duration for placement of a media object.

In an example embodiment, when the main content is the video content, the placeholder may be defined based on the frame range. For example, the placeholder may be defined as a spot in the video between the $50^{th}$ frame and $53^{rd}$ frame. Therefore, the main content, i.e., the video content, has a placeholder for placing the media object for a duration of 4 frames. In another example embodiment with the main content being the video content, the placeholder may be a reference area existing through one or more frames of the video content. For example, the placeholder may be a surface of a drink can held by an actor in the video content.

In an example embodiment, when the main content is the still image, the placeholder may be defined based on the reference area. For example, if the still image depicts a bus, the placeholder may be defined as a side of a bus in the still image.

Following the detection of the placeholders, the obtainer 106 may obtain a plurality of media objects having placement attributes corresponding to a placeholder in the main content. A placement attribute is indicative of characteristics of a media object to fit in the placeholder. The placement attributes may include, but are not limited to, dimensions of the media object and a play duration of the media object.

For example, in case of the main content being the audio content and the placeholder being of a duration of 6 seconds, the obtainer 106 may obtain media objects that can fit within the duration of 6 seconds. In an example embodiment, the obtainer 106 may obtain one media object with the play duration of 6 seconds. In another example embodiment, the obtainer 106 may obtain two media objects with collective play durations of 6 seconds. In an example embodiment, the obtainer 106 may obtain the media objects from the data repository as explained earlier. In another example embodiment, the obtainer 106 may obtain the media objects from an object data repository (not shown) that is independent of the data repository of the main content.

After obtaining the plurality of media objects by the obtainer 106, the selector 108 may select one of the plurality of media objects for being placed in the placeholder of the main content. In an example embodiment, the selector 108 may select a media object to be placed in the placeholder, based on a user profile. The user profile is indicative of preferences of a user with respect to viewing of content. A profile of the user may be maintained based on historical usage data of the user. Specifically, the system 100 may keep a record of activities of the user and predict preferences of the user accordingly.

In an alternate example embodiment, the selector 108 may provide the plurality of media objects obtained by the obtainer 106 to the user. The selector 108 may provide the plurality of media objects to the user in form of a list through a Graphical User Interface (GUI) (not shown). The list may be shown on a multimedia device (not shown) used by the user. The multimedia device may include, but is not limited to, a personal computing device, a smart phone, a laptop, an infotainment system installed in an automobile, an in-flight infotainment system, and a smart television.

In response to providing of the plurality of media objects, the selector 108 may receive an instruction from the user. The instruction is indicative of selection of a media object, from among the plurality of media objects, for being placed in the placeholder of the main content.

Further, in continuation with selection of the media object based on the user profile or the receipt of the instruction from the user, the generator 110 may generate a final content. The final content is indicative of the selected media object embedded in the main content.

In an example embodiment, the generator 110 may integrate at least one content enhancement effect to the selected media object embedded in the main content. The content enhancement effect may include, but is not limited to, a blur effect, a sharpness effect, a saturation effect, a brightness effect, a hue effect, and a contrast effect.

Further, the renderer 112 may render the final content to the user. In an alternate embodiment, the final content may not be in a format that can be rendered by the renderer 112 to the user. In such an example embodiment, the converter 114 may convert the final content into a new format. In an example embodiment, the converter 114 may detect whether the final content has to be converted or not, based on specification of a software or a hardware available for rendering the final content. In an example embodiment, the software may invoke a request for conversion into the new format. In another example embodiment, the user may invoke conversion of the final content into the new format. Subsequently, the converter 114 may render the final content to the user in the new format. In an example embodiment, the renderer 112 may render the final content to the user through a hardware device, such as a monitor and a speaker. In another example embodiment, the renderer 112 may be rendered in form of a data stream, a radio broadcast, and a file, without departing from the scope of the present disclosure.

Figure 2:
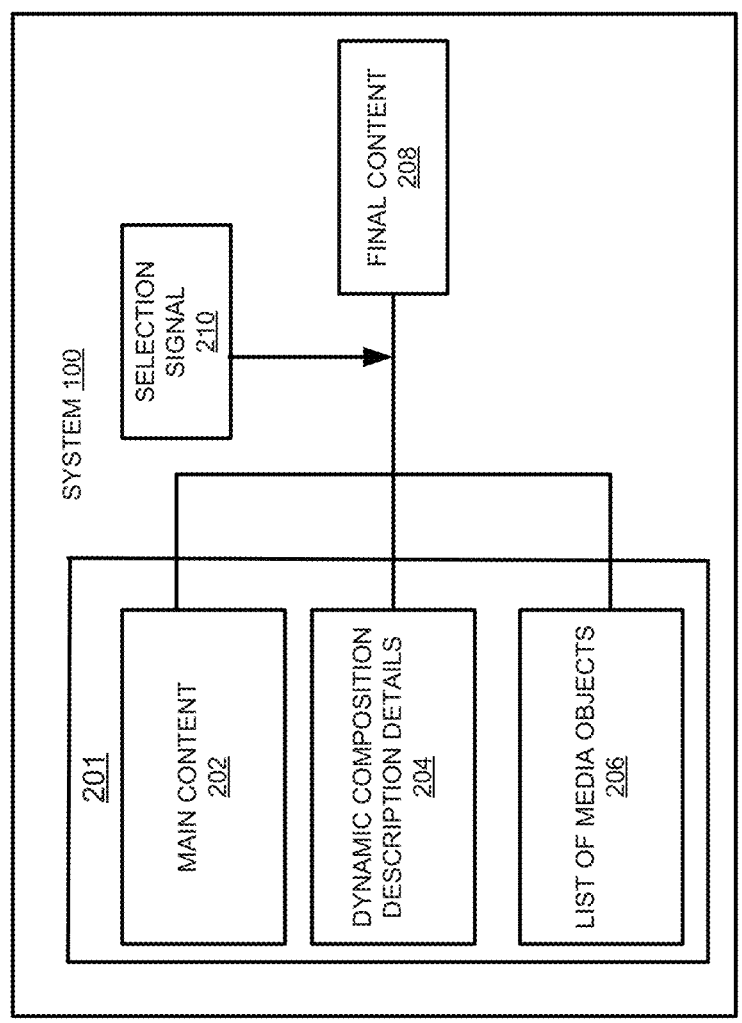
FIG. 2 illustrates another block diagram depicting functionalities of the system, according to another example embodiment of the present disclosure.

FIG. 2 illustrates another block diagram depicting functionalities of the system 100, according to another example embodiment of the present disclosure. The components of the system 100 are already explained in detail in the description of FIG. 1. FIG. 2 is provided to provide a more detailed understanding and clarity of the present disclosure, and therefore, should not be construed as limiting. For the sake of brevity, features of the present disclosure that are already explained in the description of FIG. 1 are not explained in detail in the description of FIG. 2.

As shown, the system 100 may process the main content 202 based on dynamic composition description details 204 and a list of media objects 206, e.g., the media objects, to output dynamically generated content, i.e., the final content 208. In one example embodiment, the dynamic composition description details 204 may include compositional details of the main content 202. The compositional details may be described in a flat file. The format of the flat file may include, but is not limited to, a JSON format, an XML format, and a TXT format.

The compositional details may include operational details of the main content 202. In an example embodiment, when the main content is the audio content, the operational details may include customization of sentences, music, and sounds in an audio track. In another example embodiment, when the main content is the still image, the operational details may include insertion of images, text, and 3D objects in the image. In yet another example embodiment, when the main content is the video content, the operational details may include insertion of images, text, 3D objects, and other videos in the video content.

Further, the dynamic composition description details 204 may include details pertaining to the detected placeholder in the main content 202. As explained earlier, the placeholder is defined based on at least one of the timestamp, the time range, the frame range, and the reference area in the main content 202.

In case of the main content 202 being an animation, the system 100 may detect a location of the placeholder based on different coordinates over time dimension. Such coordinates may be defined on key frames. A key frame is indicative of a frame of the animation that is being used as reference for locating the placeholder. In an example embodiment, the system 100 may define two key frames, a first key frame and a second key frame. Specifically, a first frame and a twelfth frame of the animation may be defined as the first key frame and the second key frame, respectively.

In one example embodiment, the list of media objects 206 may be an organized data structure containing descriptions of media objects. The list of media objects 206 may alternatively be an organized data structure containing descriptions of media objects and copies of the media objects. The list of media objects 206 may also or alternatively include corresponding placement attributes. In an example embodiment, the placement attributes may include a retrieval path of a corresponding media object. The retrieval path may be located either locally on an internal or an external drive, for example, a hard drive, or in one of a memory or a cache. In an example embodiment, the retrieval path may be located online where it may be accessible by a Unique Resource Location (URL).

In yet another embodiment, system 100 may be embodied in the form of a user application for content playback (e.g., a standalone mobile application, or alternatively, a plug-in or extension for an Internet browser). Receiver 102 may receive a multimedia container 201 containing main content 202, dynamic composition description details 204, and the list of media objects 206. In an example embodiment, renderer 112 may render the final content at a back end server separate from a system displaying the final content to a user. Alternatively, renderer 112 may render the final content locally on the system displaying the final content. Rendering the final content locally may be beneficial in cases where no Internet connection is available and also in cases where the system displaying the final content has enough CPU power and memory to render the final content itself.

In an example embodiment, when the final content is rendered locally, the rendering may be done dynamically based on playback of the content. Specifically, the multimedia container 201 containing main content 202, dynamic composition description details 204, and the list of media objects 206 may be downloaded on a local machine such as a mobile device, smart TV or personal computer. Furthermore, as the main content 202 is being played, detector 104 may detect one or more placeholders in the main content 202 based on the dynamic composition description details 204. Obtainer 106 may obtain the list of media objects 206 and selector 108 may select the appropriate media object to add or replace into the main content 202 either by itself or based on information received from an external system or a user. All of the actions described above may occur in real time. Furthermore, renderer 112 may render the replacement/additional media objects at a predetermined time such as, for example, 1 minute before playback and render the replacement/additional media objects in the background. Alternatively, a targeted version of the content may be rendered upon receipt of the multimedia container 201 and then included in the playback of the final content.

Figure 3:
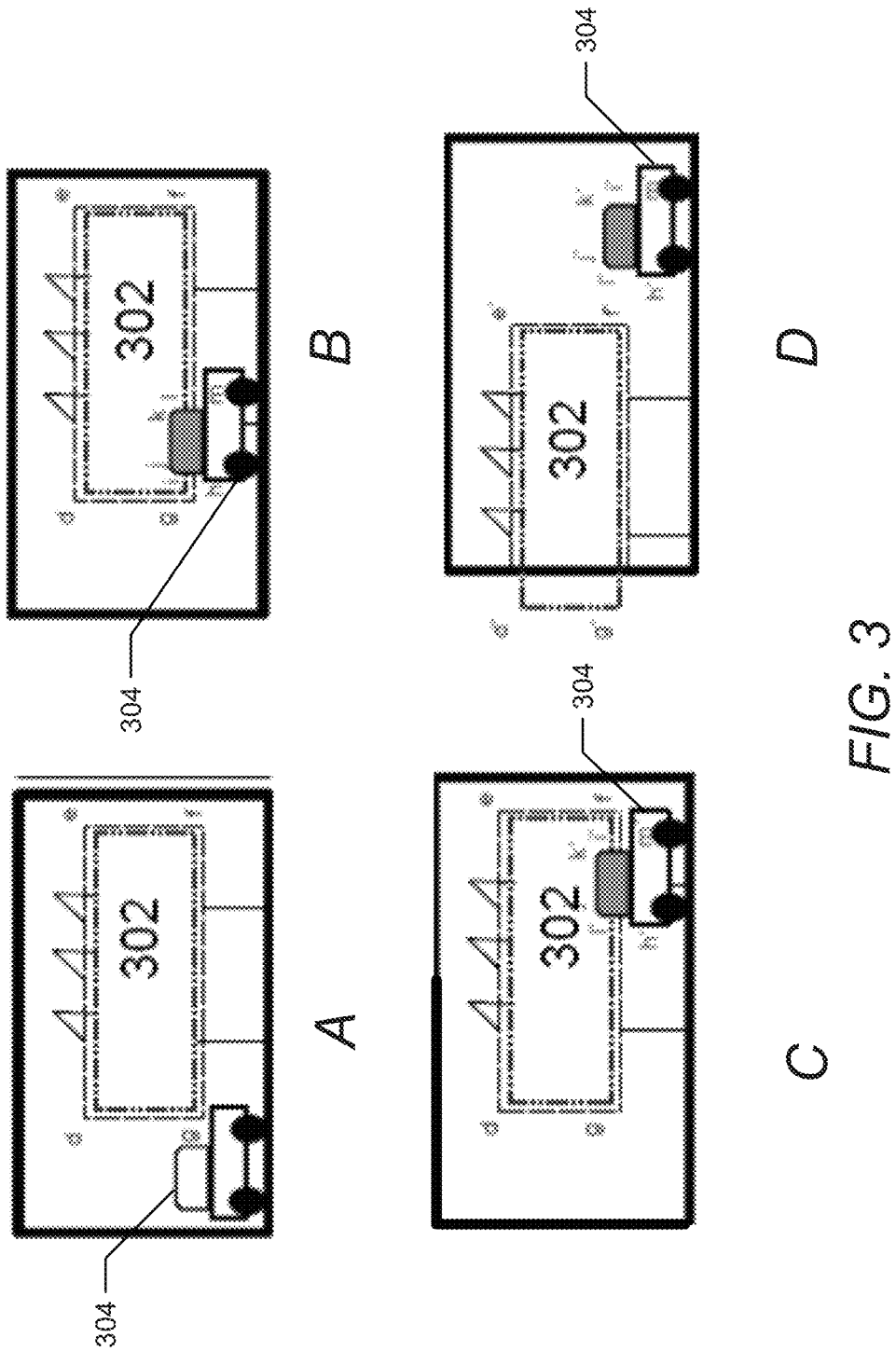
FIG. 3 illustrates moving location of a placeholder in an animation, according an example embodiment of the present disclosure.

FIG. 3 illustrates moving location of a placeholder 302 in an animation, according to one or more example embodiments of the present disclosure. For the sake of brevity, features of the present disclosure that are already explained in the description of FIG. 1 and FIG. 2 are not explained in the description of FIG. 3.

Block A in FIG. 3 illustrates the placeholder 302 being clearly visible in a key frame kf of the animation. The location of the placeholder 302 is defined by a zone (d, e, f, g) in the key frame kf. A vehicle 304 is also shown to be approaching the placeholder 302.

Block B in FIG. 3 illustrates a key frame kf+1 of the animation. As shown, in the present key frame, the vehicle 304 is driving past the placeholder 302. A portion of the vehicle 304 acting as a mask to the placeholder 302 is depicted by coordinates (k, i, j, k, l, m). The mask is defined by the coordinates.

Block C in FIG. 3 illustrates a key frame kf+2 of the animation, As shown, in the present frame, the portion of the vehicle 304 is acting as the mask to the placeholder 302 in coordinates (k', l', j', k', l', m').

Block D in FIG. 3 illustrates a key frame kf+3 of the animation. In the present key frame, the location of the placeholder 302 is now defined by a zone (d', e', f', g'). The portion of the vehicle 304 is acting as the mask to the placeholder 302 in the coordinates (k', l', j', k', l', m').

Referring back to FIG. 2, the list of media objects 206 may also include the corresponding placement attributes. In an example embodiment, the placement attributes include a retrieval path of a corresponding media object. The retrieval path may be located either locally on an internal or an external drive, for example, a hard drive, or in one of a memory or a cache. In an example embodiment, the retrieval path may be located online where it may be accessible by a Unique Resource Location (URL).

The system 100 may determine that multiple media objects 206 may be positioned in a placeholder. After the processing, the system 100 may receive a selection signal 210 indicative of the selection of one of the media objects 206 for being shown to the user along with the main content 202 as the final content 208.

The media object 206 may be selected based on the user profile or the user instruction. In one example embodiment, an external selector may determine the media object 206 to be embedded in the main content 202 for rendering or conversion. In another example embodiment, the external selector may share details pertaining to the user profile with the system 100. The system 100 may then determine the media object 206 to be embedded in the main content 202.

After the selection of the media object 206, the system 100 may retrieve the selected media object 206 based on the retrieval path disclosed in the corresponding placement attributes. Subsequently, the final content 208 may be rendered to the user.

In an example embodiment, the system 100 may generate multiple copies of the final content 208. In another example embodiment, the system 100 may share the final content 208 with user through any network or communication protocol. In one example embodiment, the system 100 may play the final content 208 for the user through a local multimedia application. In another example embodiment, the system 100 may stream the final content 208 for the user through a browser player.

In one example embodiment, the system 100 may render the final content 208 through an ad hoc player that dynamically generates the final content 208 based on the selection signal 210. In another example embodiment, the system 100 may generate the final content 208 in a common multimedia file format.

Figure 4:
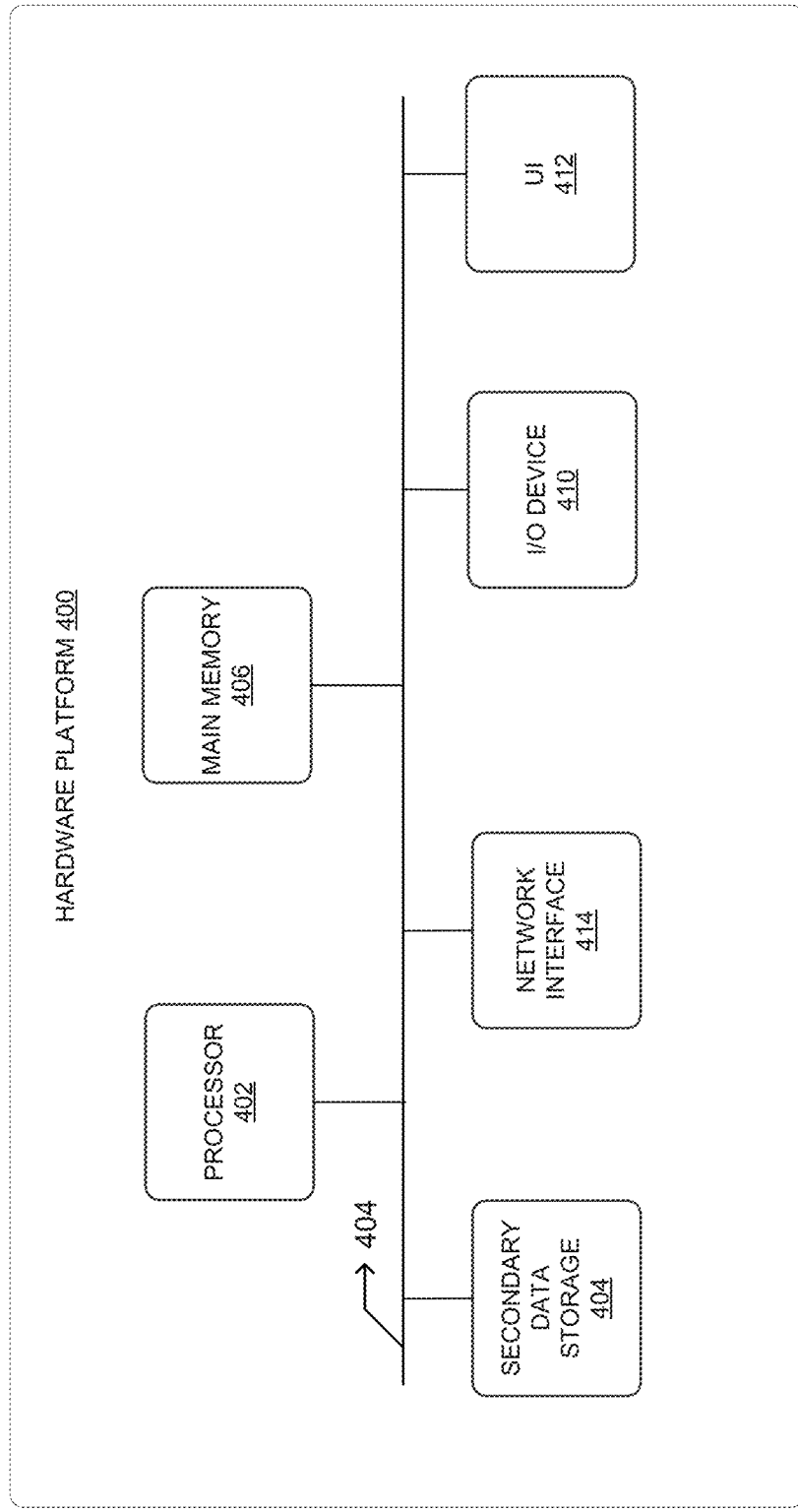
FIG. 4 illustrates a hardware platform for implementation of the system, according to an example embodiment of the present disclosure.

FIG. 4 illustrates a hardware platform 400 for implementation of the system 100, according to an example of the present disclosure. In an example embodiment, the hardware platform 400 may be a computer system 400 that may be used with the examples described herein. The computer system 400 may represent a computational platform that includes components that may be in a server or another computer system. The computer system 400 may execute, by a processor (e.g., a single or multiple processors) or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 400 may include a processor 402 that may implement or execute machine readable instructions performing some or all of the methods, functions, techniques and/or other processes described herein. Commands and data from the processor 402 may be communicated over a communication bus 404. The computer system 400 may also include a main memory 406, such as a random access memory (RAM), where the machine readable instructions and data for the processor 402 may reside during runtime, and a secondary data storage 408, which may be non-volatile and stores machine readable instructions and data. The memory 406 and data storage 408 are examples of non-transitory computer readable mediums. The memory 406 and/or the secondary data storage may store data used by the system 100, such as an object repository including web objects, configuration data, test data, etc.

The computer system 400 may include an Input/Output (I/O) device 410, such as a keyboard, a mouse, a display, etc. A user interface (UI) 412 can be a communication device that provides textual and graphical user interfaces to a user of the system 100. The UI 412 may operate with I/O device 410 to accept from and provide data to a user. The computer system 400 may include a network interface 414 for connecting to a network. Other known electronic components may be added or substituted in the computer system. The processor 402 may be designated as a hardware processor. The processor 402 may execute various components of the system 100 described above and perform the methods described below.

Figure 5:
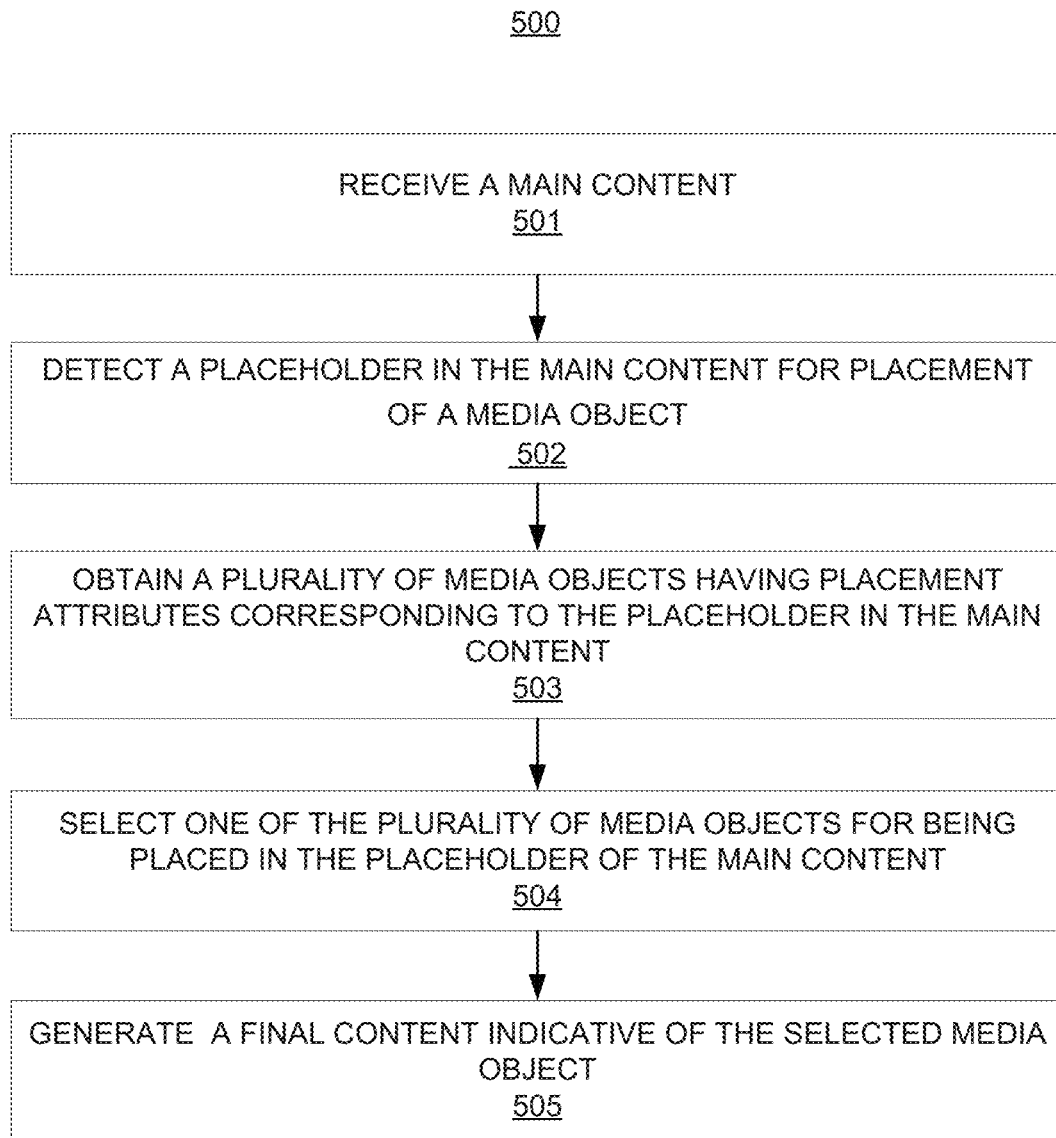
FIG. 5 illustrates a computer-implemented method depicting functionality of the system, according to an example embodiment of the present disclosure.

FIG. 5 illustrates a computer-implemented method 500 depicting functionality of the system 100, according to an example of the present disclosure. For the sake of brevity, construction and operational features of the system 100 which are explained in detail in the description of FIG. 1, FIG. 2, FIG. 3, and FIG. 4 are not explained in detail in the description of FIG. 5.

At step 501, the method 500 includes receiving a main content. In an example, the main content includes at least one of the still image, the audio content or the video content. In one example embodiment, the receiver 102 of the system 100 may receive the main content.

At step 502, a placeholder in the main content is detected for placement of a media object. The media object includes at least one of an audio file, a video file, an image, and/or a text file. The placeholder is defined based on at least one of a timestamp, a time range, a frame range, and a reference area in the main content. In one example embodiment, the detector 104 of the system 100 may detect the placeholder.

In one example embodiment, the placeholder is defined based on the timestamp when the main content is the audio content. In another example embodiment, the placeholder is defined based on the frame range when the main content is the video content. In yet another example embodiment, the placeholder is defined based on the reference area when the main content is the still image.

At step 503, a plurality of media objects having placement attributes corresponding to the placeholder in the main content is obtained. As explained earlier, the placement attribute is indicative of characteristics of a media object to fit in the placeholder. In one example embodiment, the obtainer 106 of the system 100 may obtain the plurality of media objects.

A step 504, one of the plurality of media objects is selected for being placed in the placeholder of the main content, based on the user profile. The user profile is indicative of preferences of the user with respect to viewing of the content, based on the historical usage data of the user. In an alternate example embodiment, the media object to be placed in the placeholder is selected based on a user selection. In such a case, a user may provide preference by way of a user instruction. In said example embodiment, the plurality of media objects is first provided to the user. Subsequently, an instruction from the user is received. The instruction is indicative of the selection of the media objects. In one example embodiment, the selector 108 of the system 100 may select one of the plurality of media objects.

At step 505, the final content indicative of the selected media object embedded in the main content is generated. In one example embodiment, the generator 110 of the system 100 may generate the final content. In an example embodiment, at least one content enhancement effect is integrated to the selected media object embedded in the main content. The at least one content enhancement effect includes the blur effect, the sharpness effect, the saturation effect, the brightness effect, the hue effect, and the contrast effect.

The final content is then rendered to a user. In an alternate embodiment, the method 500 includes converting the final content into a new format before being rendered to the user.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims and their equivalents in which all terms are meant in their broadest reasonable sense unless otherwise indicated.

What is claimed is:

1. A system comprising:
    a detector to detect, in real time, a placeholder in a main content, being played on the system, for placement of a media object based on dynamic composition description details of the main content, wherein the placeholder is defined based on at least one of a timestamp, a time range, a frame range, and a reference area in the main content, and wherein the dynamic composition description details include operational details of the main content and compositional details of the main content, wherein the main content includes at least one of a still image, an audio content and a video content embedded in the main content, and wherein the main content is received along with associated metadata including menus, chapters, and subtitles of the main content;
    an obtainer in communication with the detector, the obtainer, responsive to detection of the placeholder in the main content, to obtain, in real time, a plurality of media objects, each media object having a placement attribute corresponding to the placeholder in the main content, wherein the placement attribute is indicative of a characteristic of the media object compatible with the placeholder, and the placement attribute includes a dimension, a play duration, and a retrieval path of the media object, wherein when the main content is the video content, the placeholder in the main content is defined based on at least the frame range, and when the main content is the still image, the placeholder in the main content is defined based on at least the reference area, wherein the obtainer obtains, from an object repository that is different from the data repository, the plurality of media objects that individually or collectively fit into the corresponding placeholder, wherein the plurality of media objects are listed in an organized data structure, and wherein the placement attribute of each corresponding media object forms part of the list;
    a selector in communication with the detector, and the obtainer, the selector to select, in real time, a media object from among the plurality of media objects for being placed in the placeholder, based on a user profile and an instruction from the user, wherein the user profile is indicative of a preference of the user with respect to viewing of the media content, the preference being obtained based on historical usage data of the user, the historical usage data including a record of activities of the user to predict preferences of the user, the instruction being indicative of selection of the media object, from the plurality of media objects for being placed in the placeholder of the main content;
    a generator in communication with the detector, the obtainer, and the selector, the generator to generate a final content indicative of the selected media object embedded in the main content; and
    a converter in communication with the generator to:
        determine whether the final content has to be converted into a new format other than a format of the final content as generated by the generator, based on specification of software or hardware available for rendering the final content, wherein the determination that the final content has to be converted into the new format, is performed when the format of the final content is unrenderable by the user; and
        upon the determination that the final content has to be converted into the new format, convert the final content into the new format, prior to rendering the final content to the user, wherein the final content is rendered at a back end server through an ad hoc player that dynamically generates the final content in real-time based on the user profile and the instruction from the user.

2. The system of claim 1 further comprising a renderer in communication with the generator to render the final content to a user.

3. The system of claim 1, wherein the generator is further to integrate at least one content enhancement effect with the selected media object embedded in the main content, wherein the at least one content enhancement effect includes a blur effect, a sharpness effect, a saturation effect, a brightness effect, a hue effect, and a contrast effect.

4. The system of claim 1, wherein when the main content is the audio content, the placeholder in the main content is defined based on at least the timestamp.

5. The system of claim 1, wherein:
the selector is to:
provide the plurality of media objects to the user; and
receive the instruction from the user indicative of selection of a media object, from among the plurality of media objects, for being placed in the placeholder of the main content.

6. A computer-implemented method executed by at least one processor; the method comprising:
detecting, in real time, a placeholder in a main content, being played on a system implementing the computer-implemented method, for placement of a media object based on dynamic composition description details of the main content; the media object including at least one of an audio file, a video file, an image, and a text, wherein a placeholder is defined based on at least one of a timestamp, a time range, a frame range, and a reference area in the main content, and wherein the dynamic composition description details include operational details of the main content and compositional details of the main content, wherein the main content includes at least one of a still image, an audio content and a video content, and wherein the main content is received along with associated metadata including menus, chapters, and subtitles of the main content;
obtaining, responsive to the detecting of the placeholder in the main content, in real time, a plurality of media objects, each media object having a placement attribute corresponding to the placeholder in the main content, wherein the placement attribute is indicative of a characteristic of the media object compatible with the placeholder, and the placement attribute includes a dimension, a play duration, and a retrieval path of the media object, wherein when the main content is the video content, the placeholder in the main content is defined based on at least the frame range, and when the main content is the still image, the placeholder in the main content is defined based on at least the reference area, wherein the plurality of media objects are obtained from an object repository that is different from the data repository, the plurality of media objects individually or collectively fit into the corresponding placeholder, wherein the plurality of media objects are listed in an organized data structure, and wherein the placement attribute of each corresponding media object forms part of the list;
selecting, in real time, a media object from among the plurality of media objects for being placed in the placeholder of the main content, based on a user profile and an instruction from the user, wherein the user profile is indicative of a preference of the user with respect to viewing of the media content, the preference being obtained based on historical usage data of the user, the historical usage data including a record of activities of the user, the instruction being indicative of selection of the media object, from the plurality of media objects for being placed in the placeholder of the main content;
generating a final content indicative of the selected media object embedded in the main content;
determining whether the final content has to be converted into a new format other than a format of the final content as generated by the generator, based on specification of software or hardware available for rendering the final content, wherein the determination that the final content has to be converted into the new format, is performed when the format of the final content is unrenderable by the user; and
upon the determination that the final content has to be converted into the new format, converting the final content into the new format, prior to rendering the final content to the user, wherein the final content is rendered at a back end server through an ad hoc player that dynamically generates the final content in real-time based on the user profile and the instruction from the user.

7. The computer-implemented method of claim 6 further comprising rendering the final content to a user.

8. The computer-implemented method of claim 6 further comprising:
providing the plurality of media objects to the user; and
receiving an instruction from the user indicative of selection of the media object, from among the plurality of media objects, for being placed in the placeholder of the main content.

9. The computer-implemented method of claim 6 further comprising integrating at least one content enhancement effect with the selected media object embedded in the main content, wherein the at least one content enhancement effect includes a blur effect, a sharpness effect, a saturation effect, a brightness effect, a hue effect, and a contrast effect.

10. The computer-implemented method of claim 6, wherein when the main content is the audio content, the placeholder in the main content is defined based on at least the timestamp.

11. A non-transitory computer-readable storage medium including instructions that, when executed by a processor, cause the processor to:
detect, in real time, a placeholder in a main content, being played by the processor, for placement of a media object based on dynamic composition description details of the main content, the media object including at least one of an audio file, a video file, an image, and a text, wherein a placeholder is defined based on at least one of a timestamp, a time range, a frame range, and a reference area in the main content, and wherein the dynamic composition description details include operational details of the main content and compositional details of the main content, wherein the main content includes at least one of a still image, an audio content and a video content, and wherein the main content is received along with associated metadata including menus, chapters, and subtitles of the main content;
obtain, responsive to detection of the placeholder in the main content, in real time, a plurality of media objects, each media object having a placement attribute corresponding to the placeholder in the main content, wherein the placement attribute is indicative of a characteristic of the media object compatible with the placeholder, and the placement attribute includes a dimension, a play duration, and a retrieval path of the media object, wherein when the main content is the video content, the placeholder the main content is defined based on at least the frame range, and when the main content is the still image, the placeholder in the main content is defined based on at least the reference area, wherein the plurality of media objects are obtained from an object repository that is different from the data repository, the plurality of media objects individually or collectively fit into the corresponding placeholder, wherein the plurality of media objects are listed in an organized data structure, and wherein the placement attribute of each corresponding media object forms part of the list;

select, in real time, a media object from among the plurality of media objects for being placed in the placeholder of the main content, based on a user profile and an instruction from the user, wherein the user profile is indicative of a preference of the user with respect to viewing of the media content, the preference being obtained based on historical usage data of the user, the historical usage data including a record of activities of the user, the instruction being indicative of selection of the media object, from the plurality of media objects for being placed in the placeholder of the main content;

generate a final content indicative of the selected media object embedded in the main content;

determine whether the final content has to be converted into a new format other than a format of the final content as generated by the generator, based on specification of software or hardware available for rendering the final content, wherein the determination that the final content has to be converted into the new format, is performed when the format of the final content is unrenderable by the user; and upon the determination that the final content has to be converted into the new format, convert the final content into the new format, prior to rendering the final content to the user, wherein the final content is rendered at a back end server through an ad hoc player that dynamically generates the final content in real-time based on the user profile and the instruction from the user.

12. The non-transitory computer-readable medium of claim 11 further including instructions that, when executed by the processor, cause the processor to render the final content to a user.

13. The non-transitory computer-readable medium of claim 11 further including instructions that, when executed by the processor, cause the processor to:
provide the plurality of media objects to the user; and
receive an instruction from the user indicative of selection of the media object, from among the plurality of media objects, for being placed in the placeholder of the main content.

14. The non-transitory computer-readable medium of claim 11 further including instructions that, when executed by the processor, cause the processor to integrate at least one content enhancement effect with the selected media object embedded in the main content, wherein the at least one content enhancement effect includes a blur effect, a sharpness effect, a saturation effect, a brightness effect, a hue effect, and a contrast effect.

* * * * *